(12) United States Patent
Chollet et al.

(10) Patent No.: US 11,162,571 B2
(45) Date of Patent: Nov. 2, 2021

(54) PULLEY DEVICE, IN PARTICULAR FOR TENSIONING IDLER OR RUNNER ROLLER

(71) Applicant: AKTIEBOLAGET SKF, Gothenburg (SE)

(72) Inventors: Mickael Chollet, Joué-lès-Tours (FR); Thomas Perrotin, Saint Roch (FR); Simon Prevost, Tours (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 149 days.

(21) Appl. No.: 16/738,660

(22) Filed: Jan. 9, 2020

(65) Prior Publication Data

US 2020/0256448 A1    Aug. 13, 2020

(30) Foreign Application Priority Data

Feb. 11, 2019    (DE) .......................... 102019201754.1

(51) Int. Cl.
   *F16H 55/46*    (2006.01)
   *F16H 7/18*    (2006.01)
   (Continued)

(52) U.S. Cl.
   CPC ........... *F16H 55/46* (2013.01); *F16H 7/1254* (2013.01); *F16H 7/18* (2013.01); *F16H 2007/0865* (2013.01)

(58) Field of Classification Search
   CPC .......... F16H 55/36; F16H 55/46; F16H 55/42; F16H 55/44; F16H 55/48; F16H 55/52;
   (Continued)

(56) References Cited

U.S. PATENT DOCUMENTS 859,099 A * 7/1907 Nice ............... F16H 2007/0865
                                                        474/199
1,606,175 A * 11/1926 Olinger ................... F16H 55/50
                                                        474/183
(Continued)

FOREIGN PATENT DOCUMENTS

DE    202005011230 U1    9/2005
DE    102017223317 A1    6/2019
(Continued)

*Primary Examiner* — Henry Y Liu
*Assistant Examiner* — Raveen J Dias
(74) *Attorney, Agent, or Firm* — J-TEK Law PLLC; Scott T. Wakeman; Mark A. Ussai

(57) ABSTRACT

A pulley device for supporting a belt of a chain tensioning idler or a runner roller includes a bearing having an outer ring mounted for rotation relative to a coaxial inner ring and first and second C-shaped pulley parts mounted on the radially outer surface of the outer ring with their openings facing each other. The radially outer portion of the first and/or second pulley part includes at least one radial through opening, and a first portion of at least one of the pulley parts radially inward of the through opening is deformable from a first configuration in which the first pulley part is axially movable relative to the outer ring to a second configuration in which the first pulley part forms an interference fit with the outer ring or with the second pulley part. Also a method of connecting the pulley parts to the outer ring.

15 Claims, 8 Drawing Sheets

(51) Int. Cl.
*F16H 7/12* (2006.01)
*F16H 7/08* (2006.01)

(58) Field of Classification Search
CPC .......... F16H 55/56; F16H 55/566; F16H 7/12; F16H 7/14; F16H 7/16; F16H 7/18; F16H 7/1254; F16H 2007/185; F16H 2007/0865
USPC ................................................ 474/198, 199
See application file for complete search history.

(56) References Cited

U.S. PATENT DOCUMENTS

| | | | | |
|---|---|---|---|---|
| 3,367,199 A | * | 2/1968 | Dankowski | F16H 55/42 474/199 |
| 3,490,285 A | * | 1/1970 | Donath | F16H 7/12 474/187 |
| 3,633,431 A | * | 1/1972 | Van Bussel | F16H 55/44 474/168 |
| 3,771,843 A | * | 11/1973 | Clasper | B62D 55/14 474/187 |
| 3,789,683 A | * | 2/1974 | Frost | F16H 55/44 474/181 |
| 3,822,457 A | * | 7/1974 | Frost | F16H 55/44 29/892.11 |
| 3,842,475 A | * | 10/1974 | Clasper | B21D 53/26 29/892.11 |
| 3,844,010 A | * | 10/1974 | Frost | F16C 33/80 29/898.07 |
| 3,915,511 A | * | 10/1975 | Clasper | B60B 3/08 474/187 |
| 3,926,485 A | * | 12/1975 | Frost | F16C 33/7886 384/510 |
| 4,073,551 A | * | 2/1978 | Sutowski | F16C 13/006 384/501 |
| 4,443,210 A | * | 4/1984 | Olschewski | F16H 7/1281 474/112 |
| 4,457,740 A | * | 7/1984 | Olschewski | F16C 13/006 474/112 |
| 4,468,210 A | * | 8/1984 | McCutchan, Jr. | F16H 55/44 474/170 |
| 4,518,372 A | * | 5/1985 | Dye | F16C 13/006 474/199 |
| 4,571,226 A | * | 2/1986 | Molloy | F16H 7/12 474/190 |
| 4,591,352 A | * | 5/1986 | Olschewski | F16C 13/006 384/505 |
| 4,799,909 A | * | 1/1989 | Kanemitsu | B21D 53/261 474/168 |
| 4,822,111 A | * | 4/1989 | Albert | B60B 3/002 301/105.1 |
| 4,831,705 A | * | 5/1989 | Kanemitsu | B21D 53/261 29/892.11 |
| 5,725,448 A | * | 3/1998 | Kato | F16C 13/006 384/510 |
| 5,728,020 A | * | 3/1998 | Muranaka | C10M 115/08 474/199 |
| 6,102,822 A | * | 8/2000 | Nakazeki | F16C 13/006 384/523 |
| 6,196,720 B1 | * | 3/2001 | Nozaki | C10M 107/02 384/13 |
| 6,270,001 B1 | * | 8/2001 | Tadic | B23K 31/02 228/245 |
| 6,605,574 B2 | * | 8/2003 | Asao | F16C 13/006 508/376 |
| 7,485,059 B2 | * | 2/2009 | Fadler | F16H 55/44 474/166 |
| 2001/0016529 A1 | * | 8/2001 | Kawachi | F16H 55/36 474/94 |
| 2002/0086754 A1 | * | 7/2002 | Fukuwaka | F16C 33/416 474/199 |
| 2004/0178398 A1 | * | 9/2004 | Miller | F16H 55/44 254/390 |
| 2004/0235599 A1 | * | 11/2004 | Ozorak | F16C 25/08 474/199 |
| 2005/0261092 A1 | * | 11/2005 | Ochiai | F16D 41/066 474/70 |
| 2008/0220921 A1 | * | 9/2008 | Yanai | F16C 13/006 474/199 |
| 2008/0268995 A1 | * | 10/2008 | Sakamoto | F16D 9/06 474/199 |
| 2008/0287236 A1 | * | 11/2008 | Yamaguchi | F16H 55/36 474/170 |
| 2008/0300077 A1 | * | 12/2008 | Kapfer | F16C 13/006 474/133 |
| 2009/0191999 A1 | * | 7/2009 | Joseph | F16H 55/36 474/199 |
| 2009/0298630 A1 | * | 12/2009 | Mineno | F16C 35/063 474/199 |
| 2011/0111900 A1 | * | 5/2011 | Wilson | F16H 7/20 474/166 |
| 2014/0031157 A1 | * | 1/2014 | Takano | F16C 35/063 474/135 |
| 2016/0017978 A1 | * | 1/2016 | Koda | F16H 55/44 474/166 |
| 2018/0023679 A1 | * | 1/2018 | Basile | F16C 35/067 474/166 |
| 2019/0186612 A1 | * | 6/2019 | Arnault | F16H 7/08 |
| 2019/0323594 A1 | * | 10/2019 | Arnault | F16C 19/18 |
| 2019/0390756 A1 | * | 12/2019 | Arnault | F16H 57/035 |
| 2020/0124143 A1 | * | 4/2020 | Hodjat | F16H 7/02 |
| 2020/0191251 A1 | * | 6/2020 | Arnault | F16C 33/78 |
| 2020/0200221 A1 | * | 6/2020 | Inoue | F16C 33/78 |
| 2020/0256378 A1 | * | 8/2020 | Hauvespre | F16H 7/20 |
| 2020/0256447 A1 | * | 8/2020 | Arnault | F16C 19/08 |
| 2020/0256449 A1 | * | 8/2020 | Hauvespre | F16C 33/586 |
| 2020/0263766 A1 | * | 8/2020 | Arnault | F16H 55/44 |
| 2020/0263776 A1 | * | 8/2020 | Arnault | F16H 7/1254 |
| 2020/0386304 A1 | * | 12/2020 | Arnault | F16H 55/36 |

FOREIGN PATENT DOCUMENTS

| | | | |
|---|---|---|---|
| GB | 190509598 A | 5/1906 | |
| GB | 141829 A | 4/1920 | |
| WO | WO-2006092187 A1 * | 9/2006 | ............ F16C 13/006 |
| WO | WO-2007101771 A1 * | 9/2007 | ............ F16H 55/44 |

* cited by examiner

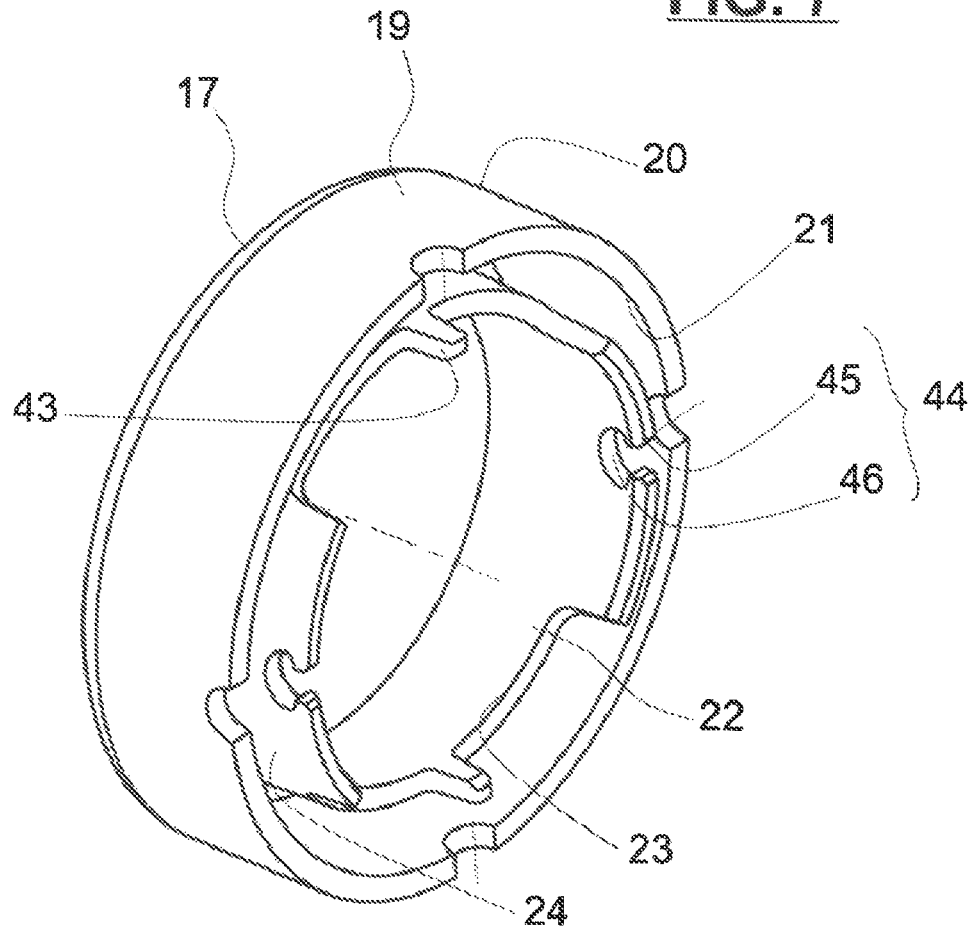

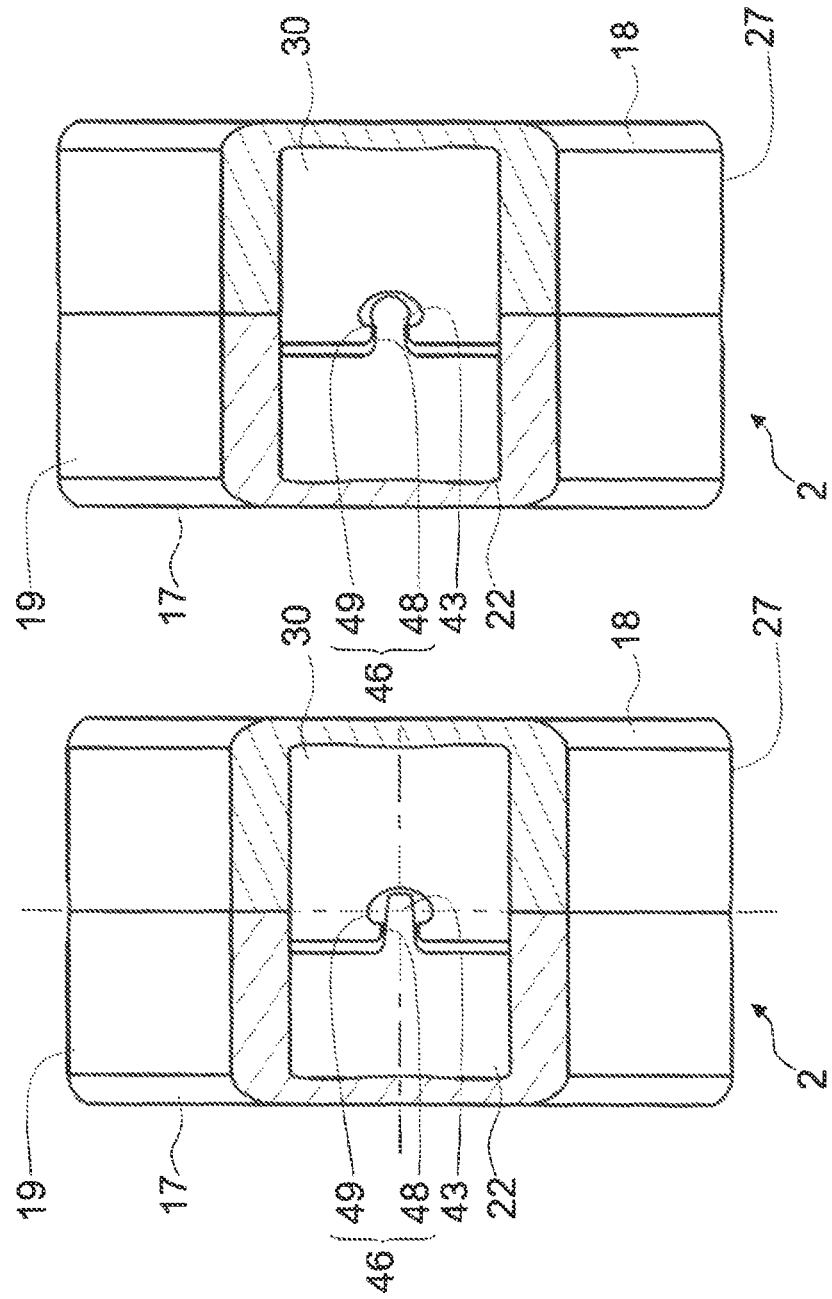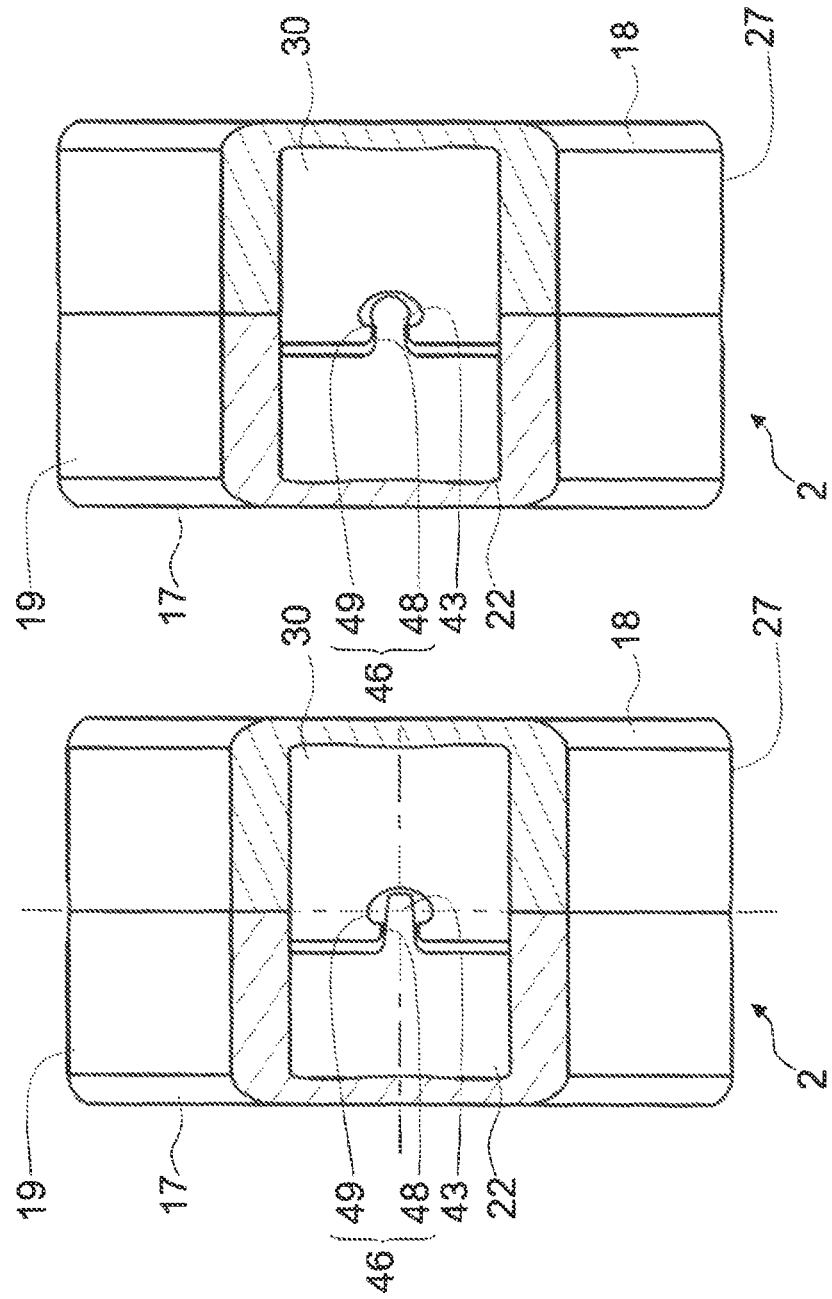

PULLEY DEVICE, IN PARTICULAR FOR TENSIONING IDLER OR RUNNER ROLLER

CROSS REFERENCE

This application claims priority to German patent application no. 10 2019 201 754.1 filed on Feb. 11, 2019, the contents of which are fully incorporated herein by reference.

TECHNICAL FIELD

The present disclosure is directed to the field of pulley devices for tensioning idlers or runner rollers designed to interact with a chain or a belt, for example a distribution belt of an internal combustion engine of a vehicle.

BACKGROUND

Such rollers are usually used to keep a tension on the belt or chain constant or in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are in an interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but said pulley can slightly axially move during the service use of pulley device. Moreover, with such a pulley, the outer part may be deformed radially inwards by bending under the action of the belt.

It has been proposed in document DE 202005011230 U1 to house a damping ring within a C-shaped pulley, said damping element being configured to damp vibrations from the belt and being suitable to limit radial inward deformation of outer portion of said pulley. However, the pulley can still be deformed under heavy loads.

SUMMARY

The aim of the disclosure is to overcome these drawbacks by providing a pulley which is easy to install onto a bearing, of good rigidity, adapted to avoid an early wear of the belt, and permitting an efficient support of said belt.

To this end, the disclosure relates to a pulley device suitable for a belt of chain tensioning idler or runner roller, comprising a bearing and a pulley.

The bearing comprises a rotatable outer ring and a fixed inner ring, said rings being coaxial.

The pulley comprises two pulley parts each having in cross section an overall shape of a C, and each having an inner portion with an inner surface mounted on an outer cylindrical surface of an outer ring of a bearing, an outer cylindrical portion having an outer cylindrical surface intended to be in contact with the belt or the chain, and a radial intermediate portion extending substantially radially between axial ends of inner and outer cylindrical portions on one axial side of the pulley device, said pulley parts being formed integral, each defining an open end on one axial side, said open ends axially facing each other, and said outer portions being in axial abutment against each other.

According to the disclosure, at least one outer through-hole is radially provided through outer portions of pulley. At least one of the inner portions of pulley parts comprises a portion configured to be deformed by an external tool inserted through the outer through-hole so as to form mechanical retention means for the pulley part with respect to the other pulley part and/or the outer ring of bearing.

According to further aspects of the disclosure which are advantageous but not compulsory, such a pulley device may incorporate one or several of the following features:

- The bearing is a rolling bearing, at least one row of rolling elements being radially interposed between the inner ring and the outer ring.
- The rolling elements are balls.
- The rolling elements are equally circumferentially spaced and maintained by an annular cage.
- The two pulley parts are symmetrical with respect to a transverse radial plane passing through the centre of the bearing.
- The total length of the inner portions of the pulley parts mounted onto the outer ring is at least equal to 90% of the axial length of the outer cylindrical surface of said outer ring.
- The outer portions of pulley parts are of greater axial length than that of their inner portions, said outer portions protruding axially on at least one axial side of the inner portions.
- The inner portions of the pulley parts are force fitted onto the outer cylindrical surface of outer ring of bearing.
- The inner portion of pulley part is cylindrical, with an inner cylindrical portion.
- The pulley parts are made from a stamped metal sheet or blank.
- The outer portions of pulley parts each comprise at least one through recess, two associated through recesses of the two pulley parts forming one radial outer through-hole.
- The pulley comprises a plurality of outer through-holes.
- Outer through-holes are circumferentially equally spaced.
- The inner portion of one pulley part comprises at least one outwardly axially-extending lug, and the inner portion of the other pulley part comprises at least one recess open towards the lug, the recess having an opening sized to receive the lug and a core portion of larger size than of the opening, the lug extending within said core portion through the opening. The lug is configured to be radially pressed against the outer cylindrical surface of outer ring by an external tool inserted through the outer through-hole, the lug being deformed in axial directions so as to be blocked in core portion of said recess in both axial directions.
- The inner portions of pulley parts are each provided with an outwardly axially-extending lug, a first lug of one pulley part being radially arranged between a second lug of the other pulley part and the outer cylindrical surface of outer ring. The second lug is configured to be radially pressed against the first lug by an external tool inserted through the outer through-hole.
- The outer cylindrical surface of outer ring of the bearing is provided with at least one recess having in cross section a concave internal profile, said recess being centered on a transverse radial plane passing through the centre of the bearing. The pulley parts are each provided with at least one protruding portion which inwardly extends from an end of the inner cylindrical portion and is received in a corresponding recess of the outer ring so as to block a pulley part with respect to the outer ring in both axial directions. The protruding portions are formed by radial deformation exerted by an external tool inserted through the outer through-hole.

The recess provided to the outer cylindrical surface of outer ring of bearing is an annular groove.

The pulley parts each comprise a plurality of circumferentially spaced protruding portions, each being received by a corresponding recess of outer ring.

BRIEF DESCRIPTION OF THE DRAWINGS

The disclosure will now be explained in correspondence with the annexed figures, as illustrative examples, without restricting the r invention. In the annexed figures:

FIG. 7 is a perspective view of the pulley provided to the pulley device of FIG. 6; and FIGS. 8 and 9 are detailed views of assembly process of pulley parts of pulley device of FIG. 6.

DETAILED DESCRIPTION

Figure 1:
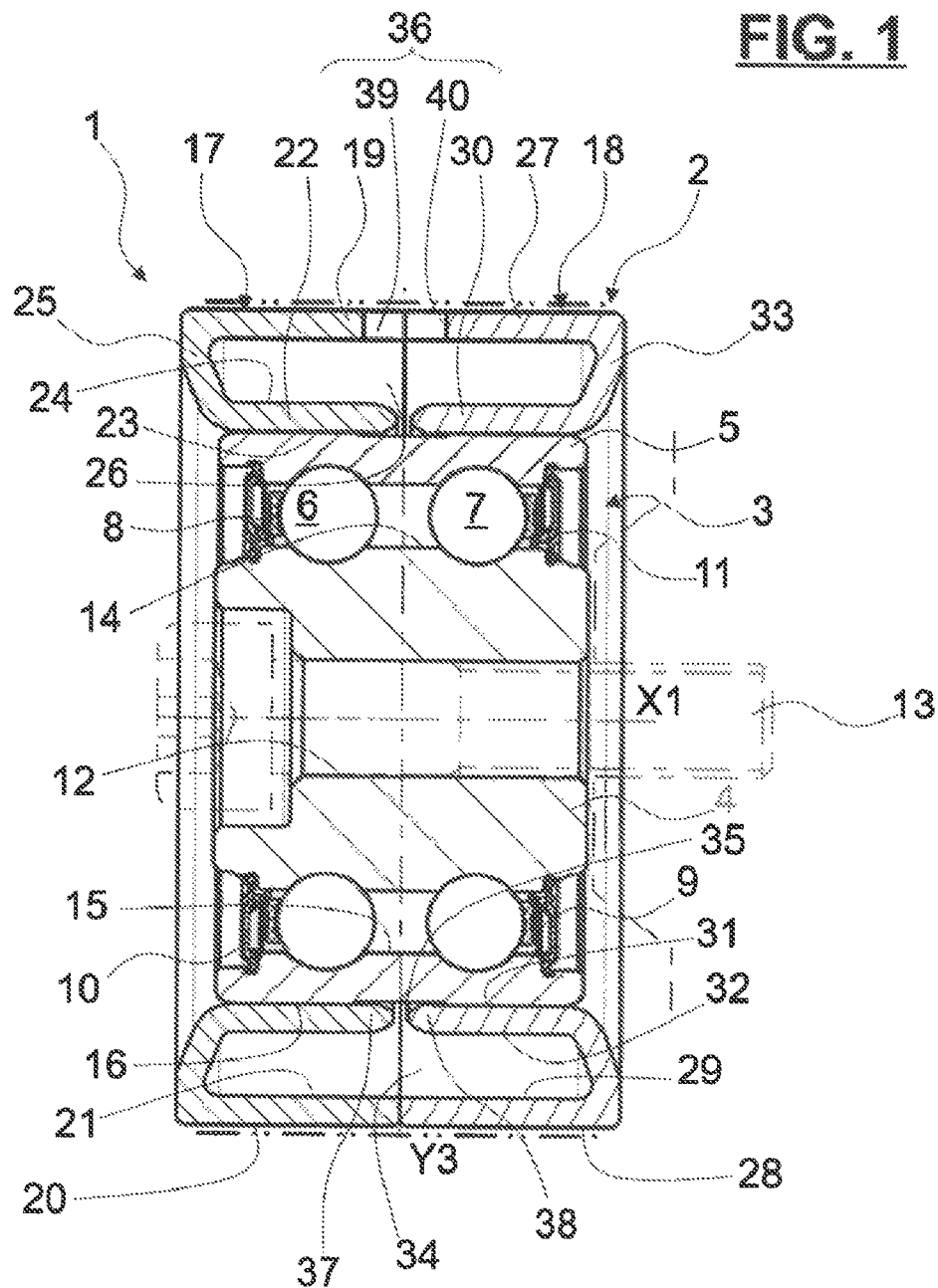
FIG. 1 is an axial section of a pulley device according to a first embodiment of the invention.

The pulley device 1 as illustrated in FIGS. 1 to 4 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of said rolling elements 6, 7, and two annular seals 10, 11.

The inner ring 4 and the outer ring 5 are concentric and symmetric with respect to a transverse radial plane Y3 passing through the centre of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 configured to receive a fastening screw 13 (in dotted line) to fasten the device 1 on an external support. The inner ring further comprises an outer cylindrical surface 14 onto which toroidal circular raceways are formed, said raceways having in cross section a concave internal profile adapted to the rolling elements 6, 7.

The outer ring 5 comprises a cylindrical bore 15 onto which toroidal circular raceways are formed, said raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, said outer portion 19 radially surrounding the inner portion 22. Advantageously, the outer portion 19 is of greater axial length than that of the inner portion 22, said outer portion 19 protruding axially on at least one axial side of the inner portion 22.

The first pulley part 17 further comprises an annular radial intermediate portion 25 extending substantially radially between axial ends of inner and outer cylindrical portions 22, 19 on a first axial side of pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing a cylindrical inner surface or bore 31 into which the outer cylindrical surface 16 of outer ring 5 of bearing 3 is mounted, and a cylindrical outer surface 32.

The outer portion 27 is of larger diameter than that of the inner portion 30, said outer portion 27 radially surrounding the inner portion 30. Advantageously, the outer portion 27 is of greater axial length than that of the inner portion 30, said outer portion 27 protruding axially on at least one axial side of the inner portion 30.

The second pulley part 18 further comprises an annular radial intermediate portion 33 extending substantially radially between axial ends of inner and outer cylindrical portions 30, 27 on a second axial side of pulley device 1, said second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface configured to interact with the belt or the chain. The pulley 2 formed by the two pulley parts 17, 18 arranged in axial contact with each other is suitable for guiding, supporting the belt of the chain with an efficient manner.

According to the disclosure, a plurality of outer through-holes 36 is radially provided through outer portions 19, 27 of pulley 2.

Figure 2:
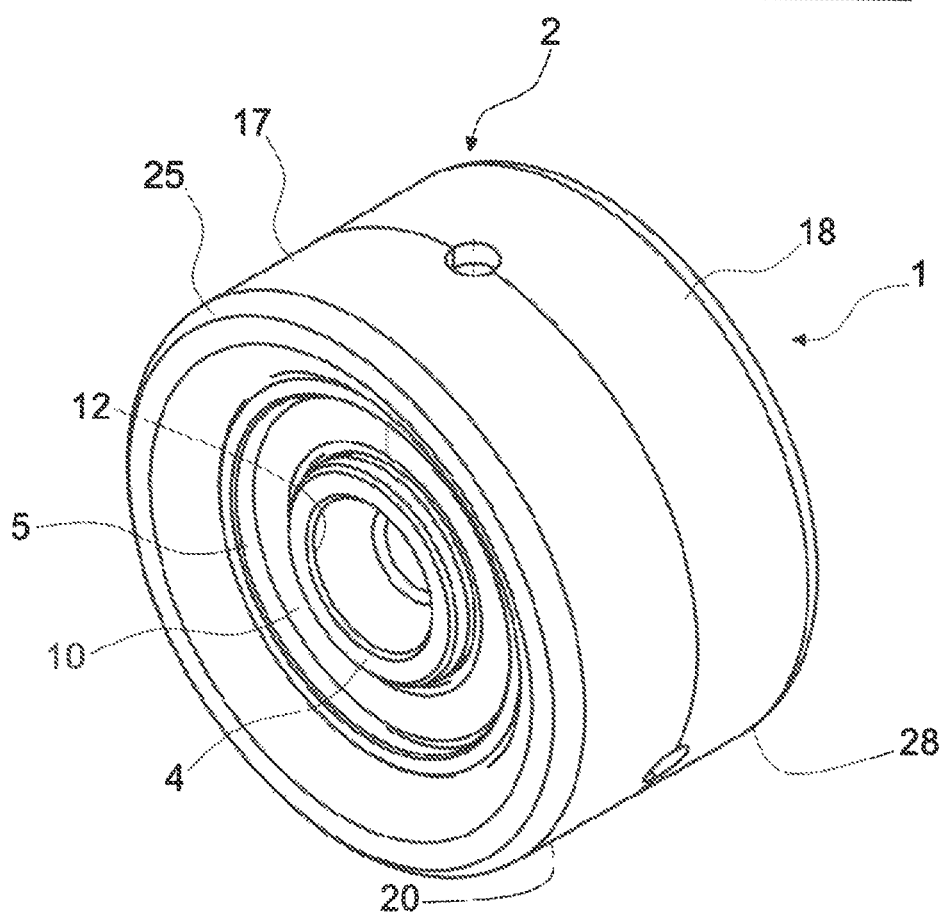
FIG. 2 is a perspective view of the pulley device of FIG. 1.
Figure 3:
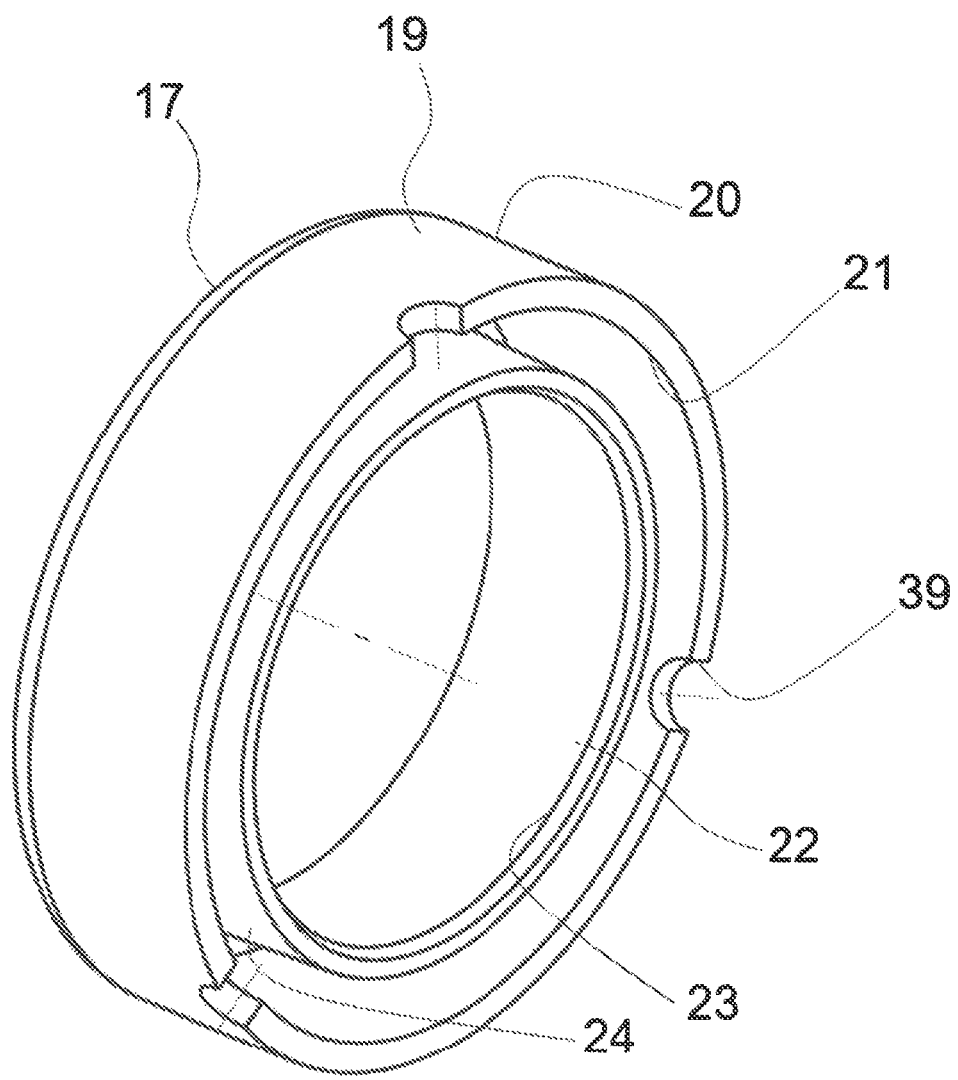
FIG. 3 is a perspective view of one pulley part provided to pulley device of FIGS. 1 and 2.
Figure 4:
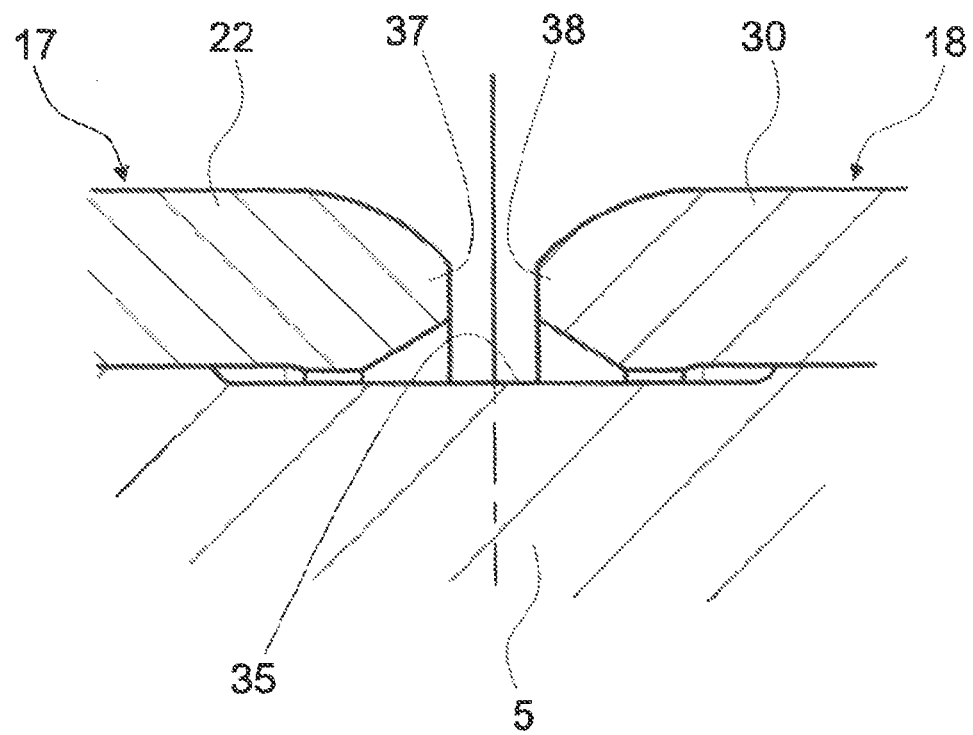
FIG. 4 is a detailed view of the pulley device of FIG. 1.

As illustrated in FIGS. 2 and 3, the outer portion 19 of pulley part 17 comprises through recesses 39 at outer portion free edge. Recesses 39 are axially open towards the second pulley part 18.

Similarly and symmetrically with respect to the radial plane Y3, the outer portion 27 of pulley part 18 comprises through recesses 40 at outer portion free edge, recesses 40 being axially open towards the first pulley part 17. Two associated through recesses 39, 40 of the two pulley parts 17, 18 form one radial outer through-hole 36.

In the present embodiment, the pulley 2 comprises three outer through-holes 36. Alternatively, the pulley 2 may comprise 1 or 2 outer through-holes, or more than 3. In the present embodiment, the outer through-holes 36 are circumferentially equally spaced. Alternatively, the outer through-holes 36 may be unevenly distributed.

According to a first embodiment of the invention, the outer cylindrical surface 16 of outer ring 5 of bearing 3 is provided with an annular groove 35. The groove 35 is centered on the transverse radial plane Y3 passing through the centre of the bearing 3.

Each of the pulley parts 17, 18 of pulley 2 further comprises a protruding portion 37, 38, respectively. More precisely:

The inner annular portion 22 of first pulley part 17 comprises a free edge with a portion 37 which is radially inwardly bent towards the outer ring 5 of bearing 3. The bent portion 37 is received by the annular groove 35 of said outer ring 5.

Similarly and symmetrically, the inner annular portion 30 of second pulley part 18 comprises a free edge with a portion 38 which is radially inwardly bent towards the outer ring 5 of bearing 3. The bent edge 38 is also received by the annular groove 35 of said outer ring 5.

The two bent portions 37, 38 are axially facing each other with respect to the central radial plane Y3, and are both received in the same groove 35 of outer ring 5.

Advantageously, the portions 37, 38 are radially inwardly deformed by an external tool inserted through the outer through-holes 36.

The two parts 17, 18 of pulley 2 are then axially blocked in both axial direction with respect to the outer ring 5 of bearing 3. Even in case of heavy vibrations or shocks, the pulley 2 is prevented for axial movement and is suitable to efficiently support the belt of the chain for an increased and efficient service life.

Figure 5:
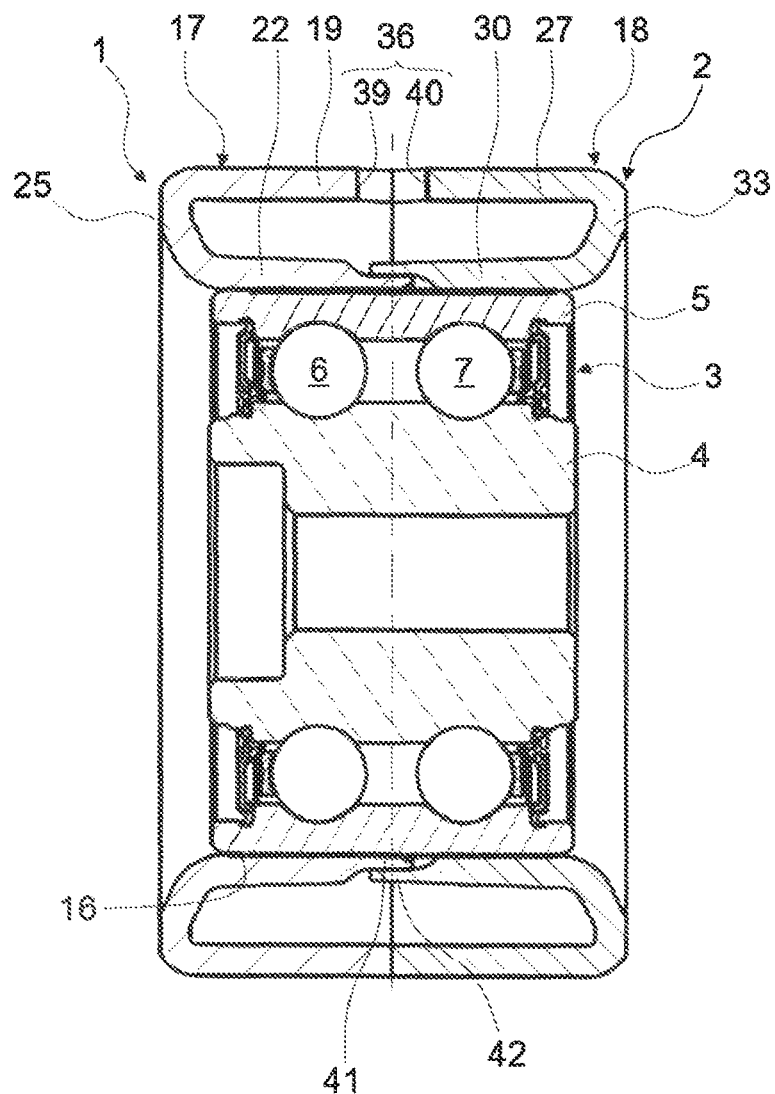
FIG. 5 is an axial section of a pulley device according to a second embodiment of the invention.
Figure 6:
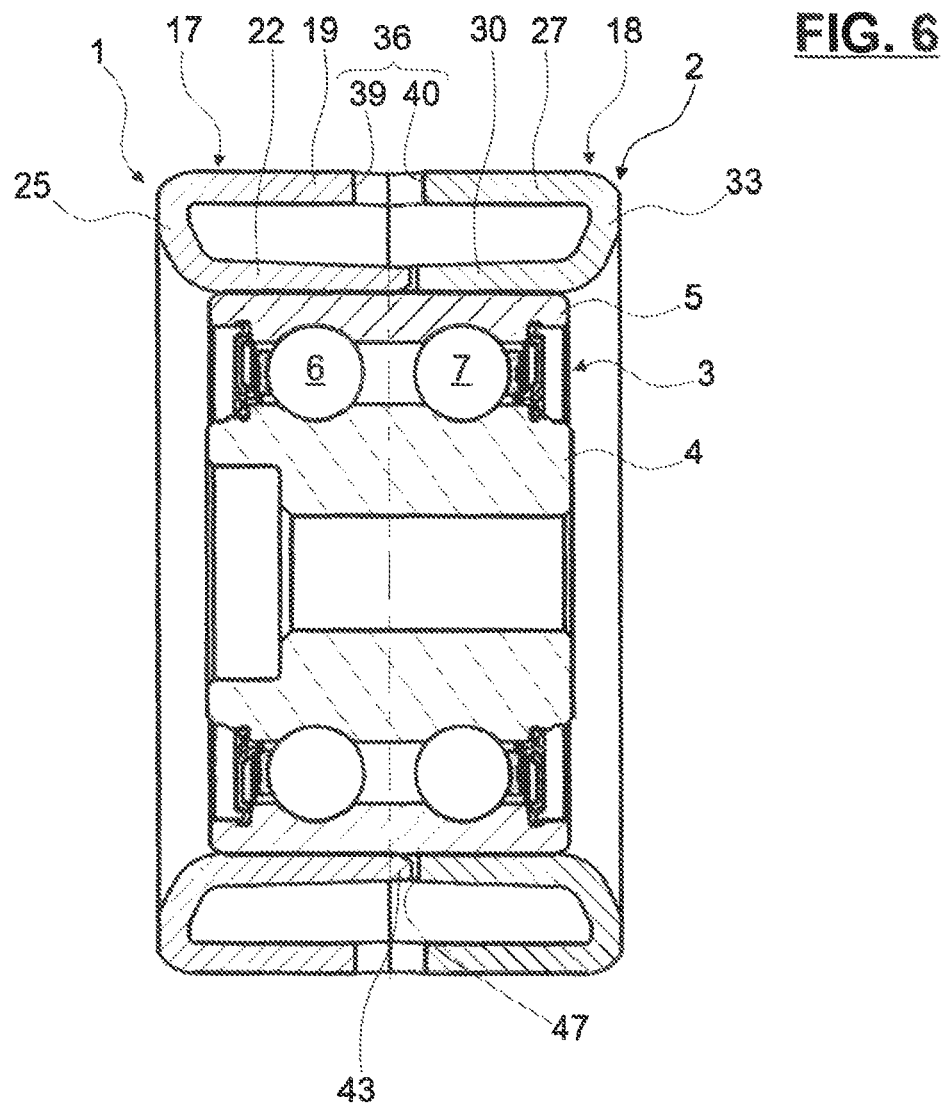
FIG. 6 is an axial section of a pulley device according to a third embodiment of the invention.

A second embodiment of the invention is illustrated in FIG. 5.

The inner portions 22, 30 of pulley parts 17, 18 are each provided with outwardly axially-extending lugs 41, 42, respectively. In the illustrated embodiment of FIG. 5, the lugs 41, 42 are annular and axially extend the inner portions 22, 30, respectively.

Alternatively, a plurality of lugs 41, 42 may be circumferentially spaced.

Lug 41 of inner portion 22 of first pulley part 17 is radially arranged between lug 42 of the other pulley part 18 and the outer cylindrical surface 16 of outer ring 5.

According to the disclosure, the upper lug 42 is radially pressed against the lower lug 41 by an external tool inserted through the outer through-hole 36. Free lugs 41, 42 of pulley parts 41, 42 are then deformed with each other so as to be attached each other. The two parts 17, 18 of pulley 2 are then axially blocked in both axial direction with respect to each other.

A third embodiment of the invention is illustrated in FIGS. 6 to 9.

The inner portion 22 of first pulley part 17 comprises a plurality of outwardly axially-extending lugs 43. Lugs are circumferentially equally spaced and axially extend from a free edge of inner portion 22.

The inner portion 30 of the first pulley part 17 also comprises a plurality of recesses 44 open towards the lug 43. Recesses 44 have each an opening 45, and a core portion 46 of larger size than of said opening 45.

Advantageously, and symmetrically, the second pulley part 18 is also provided with a plurality of such recesses 47. Recesses 47 have each an opening 48 sized to receive a lug 43, and a core portion 49 of larger size than of said opening 48. Part 18 also comprises a plurality of lugs (not illustrated).

Lugs 43 and recesses 44 of first pulley part 17 are circumferentially alternated. Lugs and recesses 47 of second pulley part 18 are also circumferentially alternated.

FIG. 8 illustrates a first mounting step of pulley 2. First and second pulley parts 17, 18 are mounted onto the outer cylindrical surface 16 of outer ring 5 of bearing 3. Advantageously, the inner portions 22, 30 are force fitted on said surface 16. Lugs 43 of first pulley part 17 are inserted in a corresponding recess 47 of second pulley part 18. Lugs 43 extend in core portion 49 of recess 47 through the opening 48.

Similarly, lugs of second pulley part 18 are inserted in a corresponding recess 44 of first pulley part 17. Each lug extends in core portion 46 of a recess 44 through the opening 45.

FIG. 9 illustrates a second mounting step of pulley 2. The lug 43 of first pulley part 17 and lugs of second pulley part 18 are each radially pressed against the outer cylindrical surface 16 of outer ring 5 by an external tool inserted through a corresponding outer through-hole 36. The lugs are then deformed in axial directions within their corresponding core portion 49, 44. Pressed lugs are then blocked against the neck defined between the core portion 49, 44 and the opening 48, 45 of reduced size. Pressed lugs and associated recesses 44, 46 are then blocked with each other in both axial directions.

The two parts 17, 18 of pulley 2 are then axially blocked in both axial direction with respect to each other.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

What is claimed is:

1. A pulley device for supporting a belt of a chain tensioning idler or a runner roller, the pulley device comprising:
   a bearing having an outer ring mounted for rotation relative to a coaxial inner ring; and
   a first pulley part, C-shaped in cross section, mounted on the outer ring and a second pulley part, C-shaped in cross section, mounted on the outer ring axially adjacent to the first pulley part, each of the first and second pulley parts comprising a cylindrical inner portion having a cylindrical inner surface in contact with a radially outer surface of the outer ring, a cylindrical outer portion having a cylindrical outer surface configured to support a belt or a chain, an intermediate portion extending radially inward from the cylindrical outer portion to the cylindrical inner portion and an opening, each of the first and second pulley parts being formed integral, the first and second pulley parts being mounted on the outer ring such that the opening of the first pulley part faces the opening of the second pulley part, wherein, the cylindrical outer portion of the first pulley part and/or the cylindrical outer portion of the second pulley part includes at least one radial through hole, the first pulley part includes a first portion radially inward of the at least one through hole, the first portion being deformable from a first configuration in which the first pulley part is axially movable relative to the outer ring to a second configuration in which the first pulley part forms an interference fit with the outer ring or with the second pulley part.

2. The pulley device according to claim 1, wherein the first pulley part and the second pulley part are symmetrical with respect to a transverse radial plane passing through a center of the bearing.

3. The pulley device according to claim 1, wherein the cylindrical inner portions of the first and second pulley parts are mounted on the outer cylindrical surface of the outer ring with a friction fit.

4. The pulley device according to claim 1, wherein the at least one radial through hole extends through the first pulley part and through the second pulley part.

5. The pulley device according to claim 1,
wherein the second pulley part includes at least one recess,
wherein the first portion of the first pulley part comprises at least one lug extending axially into the at least one recess, and wherein the first portion of the first pulley part and the at least one recess form the interference fit.

6. The pulley device according to claim 5, wherein the at least one recess includes an axially inner portion and an entrance portion, the inner portion having a greater circumferential width than the entrance portion and wherein the at least one lug extends through the entrance portion into the inner portion of the at least one recess.

7. The pulley device according to any of claim 1,
wherein the first portion of the first pulley part includes a first lug, and
wherein the second pulley part includes a second lug axially overlapping the first lug.

8. The pulley device according to claim 1, wherein,
the radially outer surface of the outer ring includes at least one recess, and
the first portion of the first pully part extends radially into the at least one recess to form the interference fit.

9. The pulley device according to claim 8, wherein the at least one recess comprises an annular groove.

10. The pulley device according to claim 1, wherein the at least one radial through hole comprises a plurality of radially through holes.

11. A method comprising:
providing the pulley device according to claim 1, and
deforming the first portion of the pulley part to form the interference fit.

12. The method according to claim 11, wherein the deforming comprises inserting a tool through the at least one through hole and using the tool to apply radially pressure against the first portion of the first pulley part.

13. The method according to claim 12, including pressing the first portion of the first pulley part radially into a groove in the outer ring of the bearing.

14. The method according to claim 12, including expanding the first portion of the first pulley part circumferentially.

15. The method according to claim 12, including deforming a first portion of the second pulley part, the first portion of the second pulley part being located radially inward of the at least one opening.

* * * * *